US012435553B2

(12) United States Patent
Humbert

(10) Patent No.: US 12,435,553 B2
(45) Date of Patent: Oct. 7, 2025

(54) HOROLOGICAL OR JEWELLERY HINGE ASSEMBLY

(71) Applicant: Harry Winston SA, Plan-les-Ouates (CH)

(72) Inventor: Marc Humbert, Aire-la-Ville (CH)

(73) Assignee: Harry Winston SA, Plan-les-Ouates (CH)

( * ) Notice: Subject to any disclaimer, the term of this patent is extended or adjusted under 35 U.S.C. 154(b) by 0 days.

(21) Appl. No.: 18/670,782

(22) Filed: May 22, 2024

(65) Prior Publication Data

US 2025/0020009 A1 Jan. 16, 2025

(30) Foreign Application Priority Data

Jul. 10, 2023 (EP) .................................... 23184361

(51) Int. Cl.
*E05D 11/08* (2006.01)
*A44C 5/02* (2006.01)
*E05D 3/02* (2006.01)

(52) U.S. Cl.
CPC . *E05D 3/02* (2013.01); *A44C 5/02* (2013.01)

(58) Field of Classification Search
CPC ........... E05D 3/02; E05D 11/06; E05D 11/08; E05D 11/081; E05D 11/084; E05D 11/087; E05D 11/088; E05D 11/1028; G06F 1/1616; G06F 1/1681; E05Y 2900/606; A44C 5/02
See application file for complete search history.

(56) References Cited

U.S. PATENT DOCUMENTS 1,637,642 A * 8/1927 Hilton .................. E05D 11/087 16/340
1,847,937 A * 3/1932 Fetters ...................... E05D 3/02 16/339
1,956,040 A * 4/1934 Meyer .................. E05D 11/081 16/340
2,366,860 A * 1/1945 Kraft ..................... B60G 11/12 267/269

(Continued)

FOREIGN PATENT DOCUMENTS

EP 2 915 445 A1 9/2015
FR 2 627 677 A1 9/1989

OTHER PUBLICATIONS

European Search Report issued Nov. 28, 2023 in European Application 23184361.6 filed on Jul. 10, 2023, 3 pages (with English Translation of Categories of Cited Documents).

*Primary Examiner* — Chuck Y Mah
(74) *Attorney, Agent, or Firm* — Oblon, McClelland, Maier & Neustadt, L.L.P.

(57) ABSTRACT

A horological or jewellery hinge assembly including an outer hinge with a first and a second knuckle and an inner hinge with a single knuckle, which pivot about a screw passing through a guide tube insertable and indexed rotatably in the first knuckle and a tube-nut insertable in the second knuckle, and axially immobilised by a head in the guide tube and including a thread cooperating with an internal thread of the tube-nut, for adjusting the axial clearance or tightness between the outer hinge and the inner hinge, the tube-nut being indexable rotatably in the second knuckle, the tube-nut or the guide tube being advantageously made of polyamide or polytetrafluoroethylene or high-density polyethylene.

11 Claims, 1 Drawing Sheet

(56) References Cited

U.S. PATENT DOCUMENTS

| | | | | | |
|---|---|---|---|---|---|
| 3,474,470 | A * | 10/1969 | Watson | A47K 13/12 | 16/337 |
| 4,630,332 | A * | 12/1986 | Bisbing | E05D 11/087 | 16/385 |
| 4,630,333 | A * | 12/1986 | Vickers | E05D 11/082 | 16/338 |
| 4,951,349 | A * | 8/1990 | Dietrich | G02C 5/2281 | 16/337 |
| 7,506,407 | B2 * | 3/2009 | Ishiwata | E05D 11/082 | 16/342 |
| 8,205,304 | B2 * | 6/2012 | Le | E05D 11/081 | 16/342 |
| 9,068,382 | B1 | 6/2015 | Hall | | |
| 2010/0309755 | A1 | 12/2010 | Kitahara et al. | | |
| 2013/0117967 | A1 * | 5/2013 | Hatano | E05D 11/082 | 16/338 |
| 2015/0250272 | A1 | 9/2015 | Moille | | |
| 2017/0022740 | A1 | 1/2017 | Hall | | |
| 2017/0105493 | A1 * | 4/2017 | Bravo | A44C 5/04 | |
| 2018/0274274 | A1 * | 9/2018 | Naganuma | E05D 11/1028 | |
| 2024/0068286 | A1 * | 2/2024 | Larson | E05D 3/02 | |

* cited by examiner

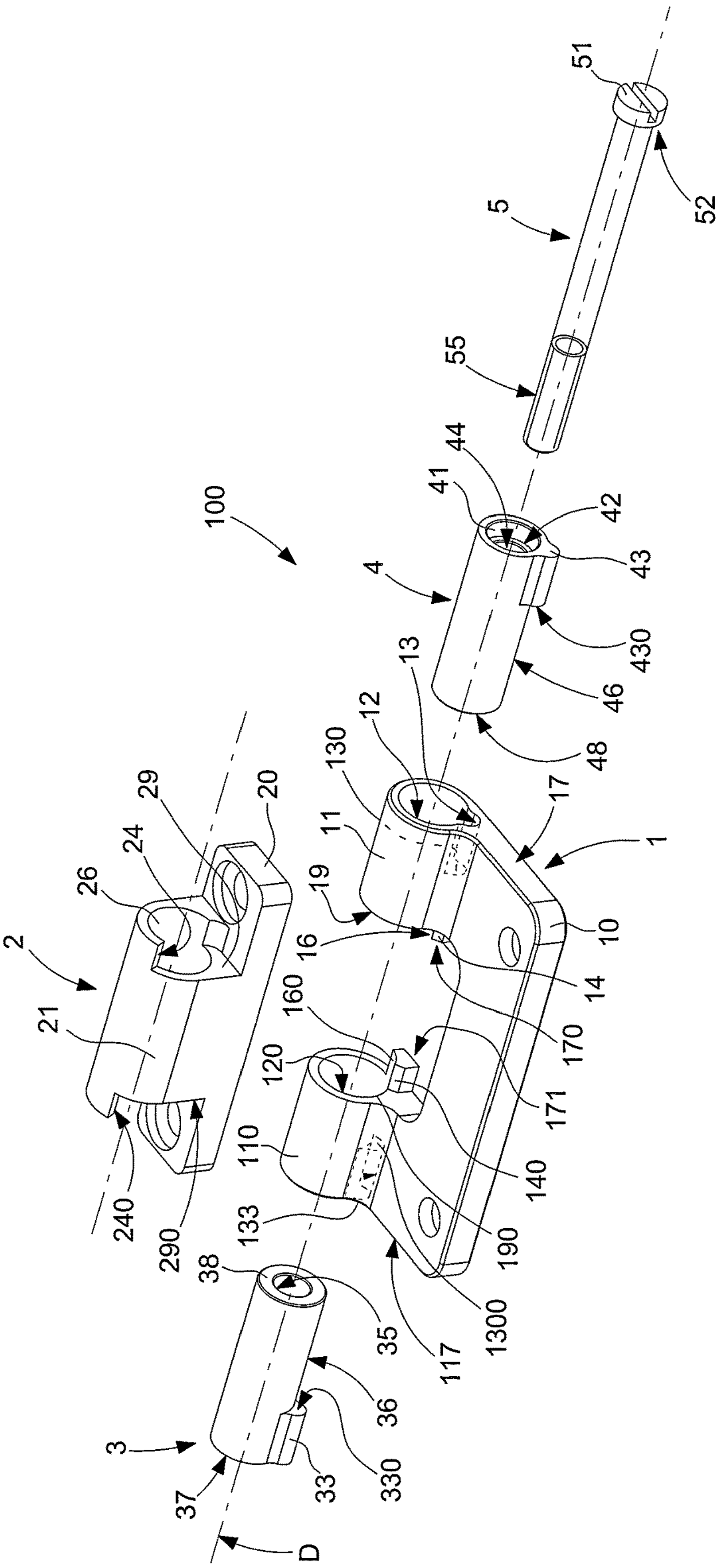
51
52
5
55
100
44
41
42
43
4
430
13
46
12
130
48
17
11
1
19
10
16
14
170
160
120
171
140
110
133
190
38
1300
35
117
36
3
330
33
37
D
2
26
24
29
20
21
240
290

HOROLOGICAL OR JEWELLERY HINGE ASSEMBLY

CROSS-REFERENCE TO RELATED APPLICATION

This application claims priority to European Patent Application No. 23184361.6 filed on Jul. 10, 2023, the entire disclosure of which is hereby incorporated herein by reference.

TECHNICAL FIELD OF THE INVENTION

The invention relates to a horological or jewellery hinge assembly including, on the one hand, an outer hinge with a first knuckle and a second knuckle which are integral with an outer base plate and including respectively a first bore and a second bore which are aligned along an axis, and on the other hand an inner hinge with a single knuckle integral with an inner base plate and insertable, with minimum clearance, between said first knuckle and said second knuckle and including a third bore capable of being aligned along said axis with said first bore and said second bore in an operating position, in which said outer hinge and said inner hinge are mounted so as to pivot relative to each other about a screw, through, on the one hand, a guide tube for said screw intended to be inserted into said first bore and including first angular indexing means intended to cooperate with complementary first angular indexing means that said outer hinge includes at said first knuckle, and, on the other hand, a tube-nut intended to be inserted into said second bore, said screw including a head for its axial immobilisation in said guide tube and a thread intended to cooperate with an internal thread that said tube-nut includes, the cooperation between said thread and said internal thread making it possible to adjust the axial clearance or tightness between said outer hinge and said inner hinge.

The invention relates to the field of articulated fasteners for timepieces or jewellery, and in particular to safety hinges.

TECHNOLOGICAL BACKGROUND

Small hinges are known, including a double-knuckle outer hinge and a single-knuckle inner hinge, where the friction of the hinge can be increased by tightening a hinge screw which holds the outer and inner hinges together, and which forms a pivot guide shaft.

Very small hinges, such as those used in the horological and jewellery industries, with guide body diameters of less than 2 millimetres at the knuckle, often fail to withstand fatigue. The outer hinge typically forms a U shape, and the bending stress zones at the inner vertices of the U often mean that the hinges have to be oversized, which is not always compatible with the horological or jewellery part that includes this hinge.

Furthermore, in addition to bending stresses in a plane passing through the hinge axis, torsional stresses are generated by the cooperation of an axial screw and its nut. Finally, friction in the bores of the knuckles quickly leads to wear that should not be overlooked, especially for top-of-the-range or luxury parts, which can have moving parts made of titratable materials, in particular gold and/or platinum alloys, or similar, and bear precious stones or other gems.

The aim is to ensure the long-term operational reliability of such a hinge.

SUMMARY OF THE INVENTION

The purpose of the invention is to provide a hinge of very small dimensions, intended to resist bending, torsion and wear, and to be perfectly reliable for the user.

To this end, the invention relates to a horological or jewellery hinge assembly including, on the one hand, an outer hinge with a first knuckle and a second knuckle which are integral with an outer base plate and including respectively a first bore and a second bore which are aligned along an axis, and on the other hand an inner hinge with a single knuckle integral with an inner base plate and insertable, with minimum clearance, between said first knuckle and said second knuckle and including a third bore capable of being aligned along said axis with said first bore and said second bore in an operating position, in which said outer hinge and said inner hinge are mounted so as to pivot relative to each other about a screw, through, on the one hand, a guide tube for said screw intended to be inserted into said first bore and including first angular indexing means intended to cooperate with complementary first angular indexing means that said outer hinge includes at said first knuckle, and, on the other hand, a tube-nut intended to be inserted into said second bore, said screw including a head for its axial immobilisation in said guide tube and a thread intended to cooperate with an internal thread which said tube-nut includes, the cooperation between said thread and said internal thread making it possible to adjust the axial clearance or tightness between said outer hinge and said inner hinge.

According to the invention, said tube-nut includes second angular indexing means arranged to cooperate with complementary second angular indexing means that said external hinge includes at said second knuckle.

Another aspect of the invention relates to the manufacture of the tube-nut and/or of said guide tube from polyamide 11 or polyamide 6-6 or polytetrafluoroethylene or high-density polyethylene.

BRIEF DESCRIPTION OF THE FIGURES

The aims, advantages and features of the invention will become clearer from the following detailed description, with reference to the accompanying drawing, in which:

FIG. 1 diagrammatically shows an exploded perspective view of a hinge according to the invention.

DETAILED DESCRIPTION OF THE INVENTION

FIG. 1 shows a diagrammatic representation of a watch or jewellery hinge assembly 100 according to the invention.

This hinge assembly 100 includes, on the one hand, an outer hinge 1 with a first knuckle 11 and a second knuckle 110 which are integral with an outer base plate 10 and including respectively a first bore 12 and a second bore 120 which are aligned along an axis D, and, on the other hand, an inner hinge 2 with a single knuckle 21 integral with an inner base plate 20 and insertable, with minimal clearance, between the first knuckle 11 and the second knuckle 110.

This single knuckle 21 includes a third bore 26 which is able to be aligned along the D axis with the first bore 12 and the second bore 120 in an operating position, in which the outer hinge 1 and the inner hinge 2 are mounted so as to pivot relative to each other about a screw 5, through, on the one hand, a guide tube 4 for the screw 5 arranged to be inserted into the first bore 12, and, on the other hand, a tube-nut 3 arranged to be inserted into the second bore 120.

The guide tube 4 includes first angular indexing means 43, which are arranged to cooperate with complementary first angular indexing means 13 included in the external hinge 10 at the first knuckle 11. The screw 5 has a head 51 for immobilising it axially in the guide tube 4, and a thread 55 which is arranged to cooperate with an internal thread 35 in the tube-nut 3. The cooperation between the thread 55 and the internal thread 35 makes it possible to adjust the axial clearance or tightness between the outer hinge 10 and the inner hinge 20. More particularly, the head 51 of the screw 5 has a flat bearing surface 52, which is arranged to abuttingly cooperate with a counterbore 42 formed at the bottom of a recessing 41, around the bore 44 formed for the passage of the screw 5 in the guide tube 4. Preferably, in the operating position, the outer surface of the screw head 51 is set back from, or flush with, the front face of the guide tube 4, and this front face of the guide tube 4 is itself set back from, or flush with, a first front face 17 of the outer hinge 1. Similarly, a front face 37 of the tube-nut 3 is also set back from, or flush with, a second front face 117 of the outer hinge 1. In the free state, without the screw, a first inner front surface 48 of the guide tube 4 is distant from a second inner front surface 38 of the tube-nut 3; any contact between them when the screw 5 is tightened in the internal thread 35 prevents any damage to the hinge, by preventing further tightening.

According to the invention, the tube-nut 3 includes second angular indexing means 33, which are arranged to cooperate with complementary second angular indexing means 133 included in the outer hinge 10 at the second knuckle 110.

More particularly, the guide tube 4 includes first axial stop means 430, which are arranged to cooperate with complementary first axial stop means 130 included in the outer hinge 10 at the first knuckle 11.

More particularly, the guide tube 4 includes a first cylindrical body 46 insertable into the first bore 12 in the first knuckle 11, and the first angular indexing means 43 include a first radial boss of the guide tube 4, and project radially relative to the first cylindrical body 46, and are arranged to cooperate with a first radial notch in the first knuckle 11 which the complementary first angular indexing means 13 include.

Even more particularly, the first radial boss carries the first axial stop means 430 at the front, and the complementary first axial stop means 130 of the first knuckle 11 include a first front bearing surface at the inner end of the first radial notch in the first knuckle 11, which notch is blind.

More particularly, the tube-nut 3 includes a second cylindrical body 36 insertable into the second bore 120 in the second knuckle 110, and the second angular indexing means 33 include a second radial boss of the tube-nut 3, and project relative to the second cylindrical body 36, and are arranged to cooperate with a second radial notch in the second knuckle 110 which the complementary second angular indexing means 133 include.

More particularly, the tube-nut 3 includes second axial stop means 330, which are arranged to cooperate with complementary second axial stop means 1300 included in the external hinge 10 at the second knuckle 110. Thus, the hinge is more resistant to torsion, which is distributed over the solid areas of the knuckles.

More particularly still, the second radial boss carries the second axial stop means 330 at the front, and the complementary second axial stop means 1300 of the second knuckle 110 include a second front bearing surface at the inner end of the second radial notch in the second knuckle 110, which notch is blind.

More particularly, the outer hinge 1 includes, between the first knuckle 11 and the second knuckle 110, and facing each other, a first lug 170 projecting axially from a first inner front face 19 of the first knuckle 11 and including a first rotational abutment surface 14, and a second lug 171 projecting axially from a second inner front face 190 of the second knuckle 110 and including a second rotational abutment surface 140. The first rotational abutment surface 14 and the second rotational abutment surface 140 are arranged to cooperate, in the abutment position, when the inner hinge 2 is in the same angular position relative to the outer hinge 1, respectively with a complementary first rotational abutment surface 24 and a complementary second rotational abutment surface 240 which the inner hinge 2 includes on either side of the single knuckle 21. More particularly, the first lug 170 includes a first lug guide surface 16, arranged to guide the guide tube 4, and the second lug 171 includes a second lug guide surface 160, arranged to guide the tube-nut 3.

Even more particularly, the first rotational abutment surface 14 and the second rotational abutment surface 140 are in the continuation of each other, and the complementary first rotational abutment surface 24 and the complementary second rotational abutment surface 240 are in the continuation of each other. More particularly still, the complementary first rotational abutment surface 24 and the complementary second rotational abutment surface 240 are formed in a first clearance 29 and a second clearance 290, which respectively limit the angular travel of the first lug 171 and of the second lug 171.

Advantageously, to reduce stress and wear, the tube-nut 3 and/or the guide tube 4 is made of polyamide 11 or polyamide 6-6 or polytetrafluoroethylene or high-density polyethylene.

More specifically, the first bore 12 and the second bore 120 of the outer hinge 1 have an inner coating of polyamide 11 or polyamide 6-6 or polytetrafluoroethylene or high-density polyethylene.

More specifically, the third bore 26 of the inner hinge 2 has an inner coating of polyamide 11 or polyamide 6-6 or polytetrafluoroethylene or high-density polyethylene.

In short, the hinge can be adjusted by screwing in the screw that passes through it, which makes it possible to adjust the hardness of this brake or mechanical friction, and the special arrangement of the guide tube and tube-nut, which are indexed rotatably, makes it possible to distribute the stresses in the hinge optimally, without exceeding the bending and torsion limits; the choice of a guide tube and tube-nut made of a material with a very low coefficient of friction, or coated with such a material, improves wear resistance.

The result is a very small, highly secure hinge that can be used in high-end timepieces and jewellery.

The invention claimed is:

1. A horological or jewellery hinge assembly comprising an outer hinge with a first knuckle and a second knuckle which are integral with an outer base plate and including respectively a first bore and a second bore which are aligned along an axis, and further comprising an inner hinge with a single knuckle integral with an inner base plate and insertable, with minimum clearance, between said first knuckle and said second knuckle and including a third bore able to be aligned along said axis with said first bore and said second bore in an operating position, where said outer hinge and said inner hinge are mounted so as to pivot relative to each other about a screw, through, on the one hand, a guide tube for said screw arranged to be inserted into said first bore and including first angular indexing means arranged to cooperate with complementary first angular indexing means that said outer hinge includes at said first knuckle, and secondly a tube-nut intended to be inserted into said second bore, said screw including a head for axial immobilisation thereof in said guide tube and a thread intended to cooperate with an internal thread in said tube-nut, the cooperation between said thread and said internal thread making it possible to adjust the axial clearance or tightness between said outer hinge and said inner hinge, wherein said tube-nut includes second angular indexing means arranged to cooperate with complementary second angular indexing means which said outer hinge includes at said second knuckle.

2. The horological or jewellery hinge assembly according to claim 1, wherein said guide tube includes first axial stop means arranged to cooperate with complementary first axial stop means which said outer hinge includes at said first knuckle.

3. The horological or jewellery hinge assembly according to claim 2, wherein said guide tube includes a first cylindrical body insertable into said first bore in said first knuckle, and wherein said first angular indexing means include a first radial boss of said guide tube and project radially relative to said first cylindrical body, and are arranged to cooperate with a first radial notch in said first knuckle which said complementary first angular indexing means include.

4. The horological or jewellery hinge assembly according to claim 3, wherein said first radial boss carries said first axial stop means at the front, and wherein said complementary first axial stop means of said first knuckle include a first front bearing surface at the inner end of said first radial notch in said first knuckle which notch is blind.

5. The horological or jewellery hinge assembly according to claim 1, wherein said tube-nut includes a second cylindrical body insertable into said second bore in said second knuckle, and wherein said second angular indexing means include a second radial boss of said tube-nut and project relative to said second cylindrical body, and are arranged to cooperate with a second radial notch in said second knuckle which said complementary second angular indexing means include.

6. The horological or jewellery hinge assembly according to claim 5, wherein said tube-nut includes second axial stop means arranged to cooperate with complementary second axial stop means that said outer hinge includes at said second knuckle.

7. The horological or jewellery hinge assembly according to claim 6, wherein said second radial boss carries said second axial stop means at the front, and wherein said complementary second axial stop means of said second knuckle include a second front bearing surface at the inner end of said second radial notch in said second knuckle, which notch is blind.

8. The horological or jewellery hinge assembly according to claim 1, wherein said outer hinge includes, between said first knuckle and said second knuckle, and facing one another, a first lug projecting axially from a first inner front face of said first knuckle and including a first rotational abutment surface, and a second lug projecting axially from a second inner front face of said second knuckle and including a second rotational abutment surface, said first rotational abutment surface and said second rotational abutment surface being arranged to cooperate in the stop position, when said inner hinge is in the same angular position relative to said outer hinge, respectively with a complementary first rotational abutment surface and a complementary second rotational abutment surface which said inner hinge includes on either side of said single knuckle.

9. The horological or jewellery hinge assembly according to claim 1, wherein said tube-nut and/or said guide tube is made of polyamide or polyamide or polytetrafluoroethylene or high-density polyethylene.

10. The horological or jewellery hinge assembly according to claim 1, wherein said first bore and said second bore of said outer hinge include an inner coating of polyamide or polyamide or polytetrafluoroethylene or high-density polyethylene.

11. The horological or jewellery hinge assembly according to claim 1, wherein said third bore of said inner hinge includes an inner coating of polyamide or polyamide or polytetrafluoroethylene or high-density polyethylene.

* * * * *